US006445976B1

(12) United States Patent
Ostro

(10) Patent No.: US 6,445,976 B1
(45) Date of Patent: Sep. 3, 2002

(54) METHOD FOR DELIVERING PRODUCTS FOR HUMAN CONSUMPTION FROM A MANUFACTURING CENTER TO PASSENGER CARRYING VEHICLES

(75) Inventor: Maurice Ostro, London (GB)

(73) Assignee: Air Fayre Limited, Middlesex (GB)

( * ) Notice: Subject to any disclaimer, the term of this patent is extended or adjusted under 35 U.S.C. 154(b) by 190 days.

(21) Appl. No.: 09/626,592

(22) Filed: Jul. 27, 2000

(51) Int. Cl.[7] ............................................... G06F 17/00
(52) U.S. Cl. ............................ 700/226; 705/26; 705/28
(58) Field of Search ................................ 700/213, 225, 700/226; 705/26, 28; 414/800, 803; 244/118.1, 118.5

(56) References Cited

U.S. PATENT DOCUMENTS 3,517,899 A * 6/1970 Vernon ...................... 244/118
5,074,496 A * 12/1991 Rezag et al. ............ 244/118.1
5,159,994 A * 11/1992 Luria ......................... 186/40
5,163,806 A * 11/1992 Robertson et al. .......... 414/786
5,496,000 A * 3/1996 Mueller .................. 244/118.1
5,759,005 A * 6/1998 Roessner et al. .......... 414/280
5,865,273 A * 2/1999 Wurtz et al. ................. 186/40
6,059,521 A * 5/2000 Rapeli ....................... 414/803

* cited by examiner

*Primary Examiner*—Christopher P. Ellis
*Assistant Examiner*—Khoi H. Tran
(74) *Attorney, Agent, or Firm*—Fish & Richardson P.C.

(57) ABSTRACT

A system for delivering products for human consumption from a manufacturing center to passenger carrying vehicles comprises packaging the products in a manufacturing center into carriers. Each carrier carrying a plurality of products. The carriers are delivered in bulk to a distribution center. At the distribution center predetermined numbers of carriers are loaded into respective containers for distribution to the vehicles. In transit in the vehicles the products are distributed to the passengers from the containers.

32 Claims, 3 Drawing Sheets

1
8
10
11
4
5
7
3
12
2

METHOD FOR DELIVERING PRODUCTS FOR HUMAN CONSUMPTION FROM A MANUFACTURING CENTER TO PASSENGER CARRYING VEHICLES

FIELD OF THE INVENTION

The present invention generally relates to a method and system for delivering products for human consumption from a manufacturing centre to passenger carrying vehicles. The present invention is particularly related to the delivery of meals for consumption by passengers in a vehicle during transit of the vehicle e.g. an aircraft or train.

BACKGROUND OF THE INVENTION

On many forms of passenger carrying vehicles it is usual to serve the passengers with a meal. In passenger carrying vehicles where space is a premium e.g. trains and aeroplanes, the food is usually provided for distribution in compact units such as trolleys to allow for easy distribution of food to the passengers.

The logistics of providing food to passenger carrying vehicles to meet the vehicle schedule is complex. This distribution problem is further complicated by the need to comply strictly with hygiene regulations. Further, some food products are fragile and can easily be damaged.

The airline industry is an area where a great deal of time and effort is expended in providing passengers with high quality food. Traditional airline caterers purchase food ingredients which they cook and prepare in their kitchens. The prepared food is then placed in packaging or onto trays which are loaded into trolleys. Traditionally, the number of trolleys and the number of meals loaded into the trolleys is tailored at the point of manufacture of the food to the requirements of the aircraft to which the food is to be delivered. Thus, traditional airline caterers require food production facilities in addition to distribution facilities. Although some products may be bought from food manufacturing centres, this is generally a minor part of the total meal being prepared.

Even when food is provided to passengers in the form of a packaged food item e.g. sandwiches, traditionally, sandwiches are received from a food manufacturer in bulk packaging e.g. cardboard boxes. The food items must then be unpacked and repacked into carriers suitable for fitting into trolleys to go onto the vehicle e.g. aircraft.

SUMMARY OF THE INVENTION

It is thus an object of the present invention to provide a more efficient distribution system which can incorporate better tracking and controls.

In accordance with the first aspect, the present invention provides a method of delivering products for human consumption from a manufacturing centre to passenger carrying vehicles. In a manufacturing centre the products are packaged into carriers, where each carrier carries a number of products. The carriers are delivered in bulk e.g. on a palette to a distribution centre. At the distribution centre predetermined numbers of the carriers are loaded into respective containers for distribution to the vehicles. On the vehicles the products are distributed to passengers during transit.

In a preferred embodiment the containers comprise trolleys which are pushed by attendants on the vehicles whilst serving the food and thus carriers are preferably adapted to fit the trolleys.

Thus this aspect of the present invention provides a significant streamlining of the delivery system. The repackaging of the products at the distribution centre is avoided thus saving time and effort and avoiding the wastage of packaging material. In the manufacturing centre, the manufacturer is provided with carriers into which they package the products. The products are thus passed right from the manufacturer to the vehicles and are returned again to the manufacturer once used. This use of the same carriers for packaging the products from the manufacturer right away to the vehicles simplifies not only the delivery logistics, but also tracking procedures for food products as a means of monitoring compliance with hygiene regulations. Further, the avoidance of repackaging of the food products greatly reduces the risk of damage to the products.

Thus this aspect of the present invention is particularly suited to the distribution of food products which are fragile or subject to hygiene regulations.

In one embodiment the distribution centre comprises a hub distribution centre, which receives the bulk packaged carriers. Spoke distribution centres are provided and are supplied with predetermined numbers of containers by the hub distribution centre. At the spoke distribution centres the number of carriers in respective containers is adjusted in dependence upon the requirements of respective vehicles. The containers are then distributed to the respective vehicles by the spoke distribution centres. Thus in this embodiment the spoke distribution centres can be provided locally to the vehicle transit points. Because the spoke distribution centres only need carry out adjustments to the number of carriers in the containers and/or to adjust the number of containers required for respective vehicles, the spoke distribution centres can be of greatly reduced scale compared to the hub distribution centre. Thus this embodiment has the advantage that for example for the supply of aircraft meals, the airport food distribution centre can be of greatly reduced scale compared to a central hub distribution centre. This greatly reduces the cost of distribution since the cost of real estate in an airport or in the vicinity of an airport is usually much higher than the cost of real estate for a distribution centre provided remotely i.e. a remote hub distribution centre.

The present invention is particularly suited to an electronic ordering and tracking system. Passenger vehicle operators can electronically place an order for products with the caterer. The order can simply identify the number of passengers but can additionally identify special dietary requirements e.g. vegetarian. The order can either be placed directly with the hub distribution centre or it can be placed with a spoke distribution centre. The benefit of placing the order with the spoke distribution centre is that the spoke distribution centre can modify the order to take into account local factors. The hub distribution centre will collate orders placed with the spoke distribution centres and will place an electronic order with the manufacturing centre for a bulk delivery of products in the carriers. If the order for the products is not placed directly with the spoke distribution centres, the hub distribution centre will send electronic data on the number of products required for respective vehicles to the spoke distribution centres. The spoke distribution centre will then determine the number of containers required to enable them to tailor the order for each respective vehicle.

In order to provide for accurate tracking of products, in an embodiment of the present invention the carriers each include a unique electronic tag. At points in the distribution the tags are detected and a computer system receives the detections to track the location and keep a history for each carrier. Thus each carrier of products can be tracked from the manufacturing centre to the vehicle. Further, the bulk delivery of carriers from the manufacturing centre can be provided in one or more bulk carriers which each include an electronic tag. Thus when the bulk delivery is made to the hub distribution centre, the tag of the bulk carrier can be detected instead of having to detect all of the tags of the carriers in the bulk carrier. At the manufacturing centre when the bulk carrier is loaded with carriers, the tags for the bulk carriers can be read and the computer system can store information identifying the identities of the carriers loaded into the bulk carriers. Thus at the hub distribution centre, it is simply necessary to detect the tag of the bulk carrier in order to identify the carriers delivered.

In one embodiment, the carriers each include a temperature detector for detecting ambient temperature and for warning if the detected temperature moves outside predetermined range or threshold. This feature can thus provide for the individual monitoring of carriers to determine their compliance with hygiene regulations. The temperature detector can comprise an electronic detector which can transmit information to the computer system for remote monitoring. Alternatively, the temperature detector can simply comprise a visible indicator to indicate if the ambient temperature for a carrier has moved outside a predetermined range or threshold.

A second aspect of the present invention provides a method of delivering meals to passenger carrying vehicles in which, at a distribution centre, packaged items are received from food preparing stations. The packaged items are assembled on a tray from a meal unit and the meal units are loaded into trolleys. The trolley are then distributed to the vehicles for serving to passengers.

Thus this aspect of the present invention enables a distribution centre to be quite separate to food preparing stations. There is no need for example for an airline caterer to have food preparing facilities. The caterer can simply assemble preprepared food for delivery to the aircraft. The food preparing station can comprise restaurants because of the careful tracking and control procedures, restaurant food can be provided. To complete the restaurant quality food delivered to the passengers, a chef can carry out final preparations on each meal on the vehicle or at the spoke distribution centre.

DETAILED DESCRIPTION OF PREFERRED EMBODIMENT

Figure 1:
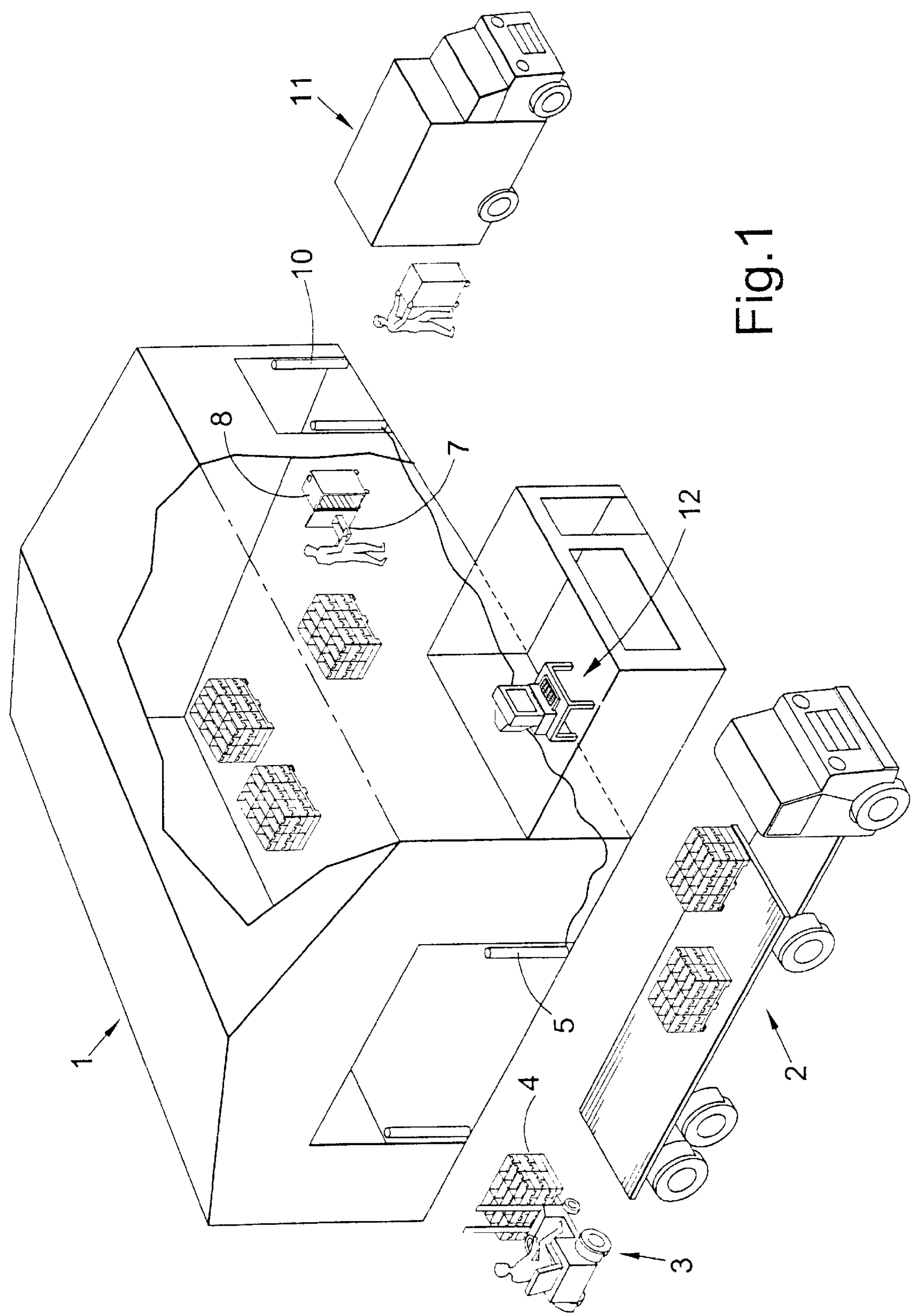
FIG. 1 is a schematic diagram of a distribution centre in accordance with the embodiment of the present invention.
Figure 2:
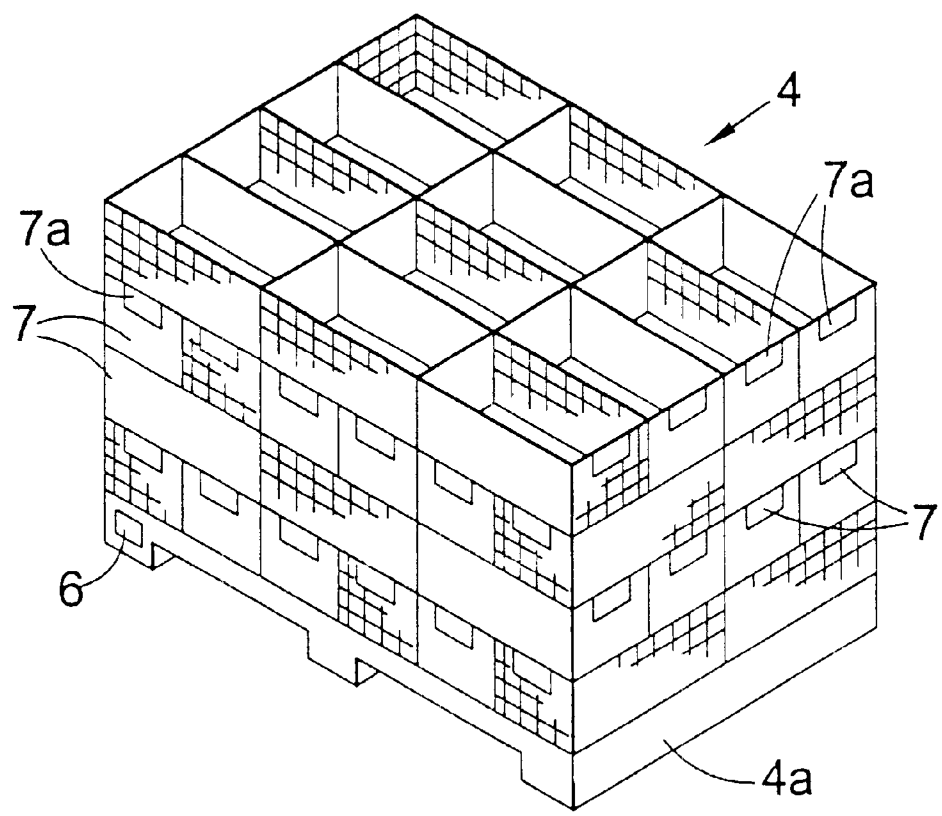
FIG. 2 is a diagram of a bulk load of carriers.
Figure 3:
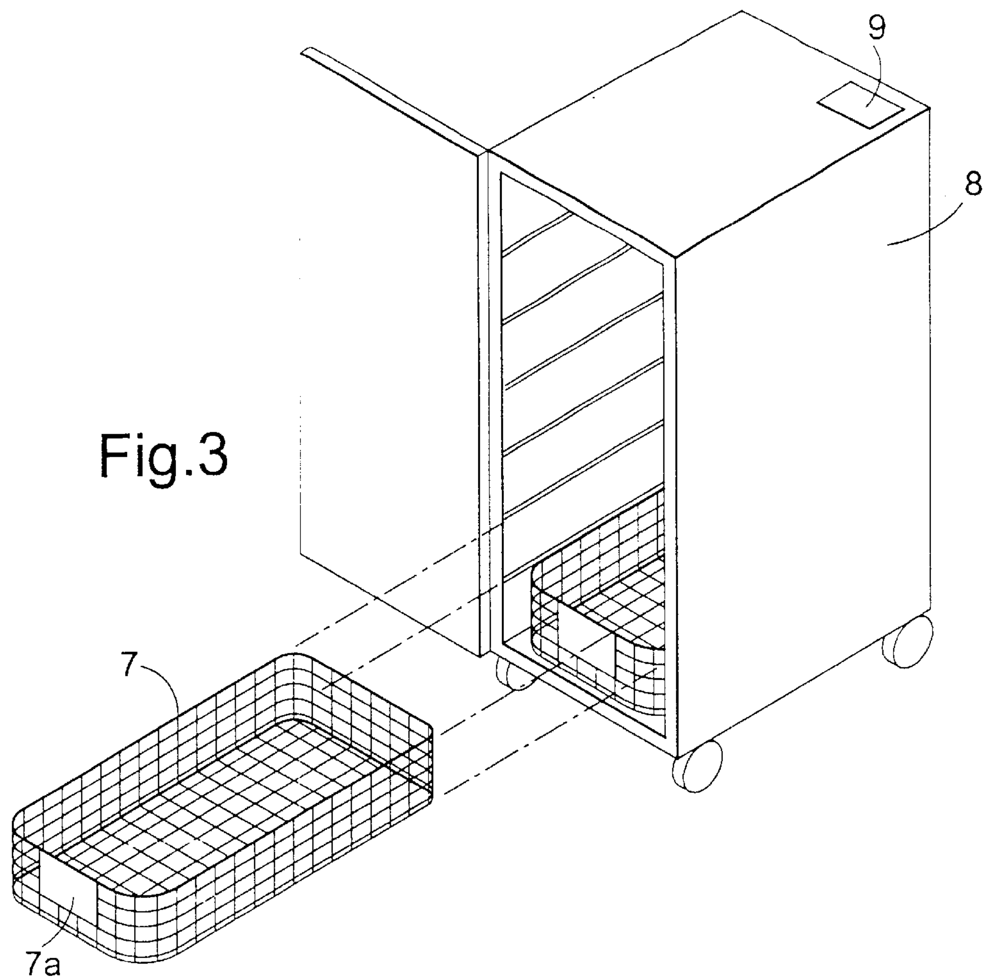
FIG. 3 is a diagram of a trolley and a carrier.

FIG. 1 schematically illustrates a distribution centre in accordance with a first embodiment of the present invention. FIG. 3 illustrates the trolley 8 and carrier 7 in more detail whilst FIG. 2 illustrates the bulk delivered containers in more detail.

At a food manufacturing centre, food products are manufactured and packaged e.g. rolls, sandwiches, pies etc. These are then placed in carriers 7 in accordance with an order from a distribution centre 1. The carrier 7 will hold a designated number of any type of food products. Alternatively, the carrier 7 may be required to be filled with a mixture of food products. This is dependent upon the order placed with the food manufacturer. Each carrier 7 has applied to it or incorporated in it a unique electronic tag. The tag can comprise any conventional electronic tag such as an RF tag as will be understood by a skilled person in the art. The tag can be read by any form of tag reader such as a hand held tag reader or a static tag reader mounted in for example a doorway.

Thus in order to fulfil an order, a food manufacturing centre will package a number of carriers 7 into a bulk order 4 carried by a palette 4*a*. The palette 4*a* has mounted thereon or incorporated therein a unique electronic tag 6. Thus, when the bulk order 4 is put together at the food manufacturing centre, the tags 7*a* of the carriers 7 which form a bulk load 4 are read together with the tag 6 of the palette 4*a*. This information is read and stored on a computer system and the information is transmitted to a computer system 12 at the distribution centre 1 from which the order for the food products originated. In this way a food manufacturing centre records and tracks food products which leave the centre. The food products in each bulk order 4 are transported by a vehicle 2 to the distribution centre 1. The bulk ordered products 4 are then unloaded by fork lift truck 3 and as they are delivered into the distribution centre 1, a tag reader 5 will detect the palette tag 6 on the palette 4*a*. The tag detections are transmitted to the computer system 12 in which the detected palette tag 6 can be matched to the identities of the carriers 7 carried on the palette 4*a*. Thus the reading of the palette tag 6 avoids the necessity for attempting to read each of the tags 7*a* on each of the carriers 7. Alternatively however each of the tags 7*a* could be detected in order to compare the expected load on the palette 4*a* with the load that the food manufacturing centre alleges to have delivered.

Where the products are subject to strict hygiene regulations and require refrigeration for example, the lorry 2 will comprise a refrigeration unit and within the distribution centre 1, the bulk orders 4 will be stored in refrigerated conditions. In order to monitor the temperature, each carrier 7 can include a temperature monitor with the tag 7*a*. The temperature monitor can provide a warning if the temperature range rises above that required for the food product. The monitor can comprise an electronic arrangement for transmitting a signal to the computer system 12 to allow the remote monitoring of the conditions of the carriers 7. Alternatively a simple arrangement can comprise a visible indicator e.g. a liquid crystal strip which will register and display a warning if the temperature rises above a threshold. The warning will remain even after the temperature has dropped to point out that the food products in the carrier 7 were exposed to high temperatures for a predetermined period of time sufficient to raise a hygiene issue.

Within the distribution centre 1, the carriers 7 are unloaded from the palette 4*a* and loaded into trolleys 8. The number of carriers 7 loaded into the trolleys 8 and the number of trolleys 8 will depend upon the order placed for a passenger vehicle. An order can be fulfilled by loading the appropriate number of trolleys 8 with the appropriate number of carriers 7 which contain the appropriate number of products. Thus the trolleys 8 are loaded onto a truck 11 for distribution to the passenger carrying vehicles, the trolleys 8 pass through a tag detector 10 to detect the tags of the carriers 7 being delivered. The tag detections are received by the computer system 12 in order to track the movement of the carriers 7. Thus in this way the movement of the carriers 7 in and out of the distribution centre 1 can be detected.

The truck 11 will provide the required conditions for the delivery of the food products e.g. it will comprise a refrigeration unit and will deliver the trolleys 8 to the aircraft. In such circumstances the distribution centre 1 comprises the sole distribution centre. In an alternative embodiment the distribution centre 1 comprises the hub distribution centre which receives the products directly from the food manufacturing centre. The hub distribution centre will then distribute the product to spoke distribution centres. Thus in FIG. 1 the trolleys 8 are filled with carriers 7 and the truck 11 delivers the trolleys 8 to the spoke distribution centres. Within the spoke distribution centres, the number of carriers 7 within the trolleys 8 is adjusted as necessary in order to accurately fulfil the order from the passenger vehicle operator.

It can thus be seen from FIG. 1 that food products delivered from the food manufacturing centre are not repackaged. The carriers 7 are simply redistributed into trolleys 8. This greatly reduces the handling of the food products thereby making it easier to comply with hygiene regulations. Further, there is no requirement to repackage the products and there is thus no wastage of packing material or time and money expended in wasted repackaging. Further, the use of a single carrier from the point of manufacture to the point of use on the passenger vehicle facilitates better control and tracking of delivery.

In addition to the tags on the carriers 7 and the palettes 4*a,* tags 9 can also be provided on the trolleys 8. This enables the trolleys 8 to be tracked. It can also enable the tag detector 10 to simply detect the trolley 8 passing thereby. If the tags 7*a* of the carriers 7 are read when the trolley 8 is loaded, and matched with the tag 9 of the trolley, the computer system 12 will have a record of the carriers 7 loaded in the trolleys 8. Thus the detection of the tags 9 of the trolleys 8 and the tag detector 10 is sufficient for the computer system to know which carriers 7 have been loaded on the truck 11.

Figure 4:
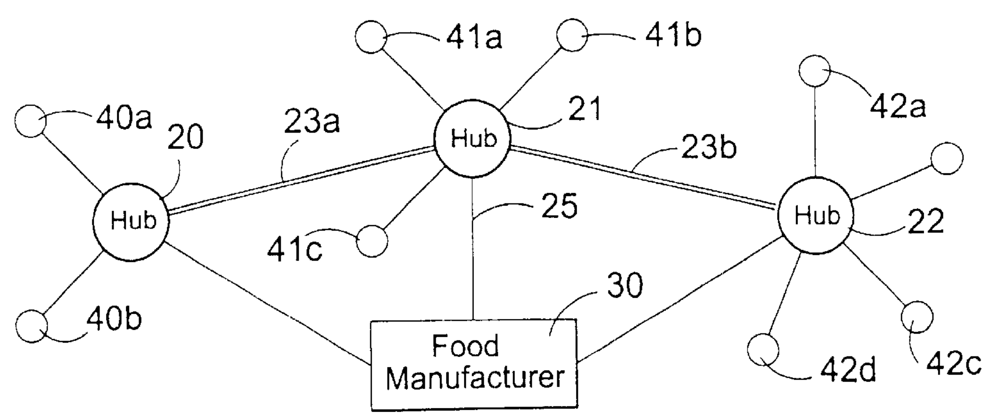
FIG. 4 is a schematic diagram of the hub and spoke distribution system in accordance with an embodiment of the present invention.

FIG. 4 is a schematic diagram of the hub and spoke distribution system in which there are three hubs 20, 21, 22 provided at separate locations and is connected by high speed communication lines 23*a* and 23*b* for the exchange of data therebetween. Each hub 20, 21, 22 is connected to a spoke distribution centre 40*a,* 40*b,* 41*a,* 41*b,* 42*a,* 42*b,* 42*c* and 42*d* respectively. A food manufacturing centre 30 is connected to each of the hubs 20, 21 and 22 via a communication line 25.

In this embodiment each spoke distribution centre is located at or near an airport or train station to provide airline or rail catering facilities. At each spoke orders will be received from airlines or rail operators being served in respect of food to be provided for specific journeys. This information can be electronically received and is passed from the spokes to the respective hub distribution centres 20, 21 and 22. The hub distribution centre 20 will collate all of the orders in order to form a bulk order for groups which is transmitted to the food manufacturer 30. When the goods are delivered by the food manufacturer 30 to the hub distribution centre 20, the hub distribution centre 20, 21 and 22 uses the information received from the spoke distribution centres i.e. the orders from the airlines or rail operators in order to determine how to distribute the products to the spoke distribution centres. Thus within the hub distribution centres 20, 21, 22 the bulk orders received from the food manufacturers 30 are split and distributed to the spoke distribution centres. As described hereinabove with reference to FIG. 1, this redistribution is carried out by placing the carriers 7 into trolleys 8 so that the spoke distribution centres simply have to adjust the number of carriers 7 required for each flight. The spoke distribution centre needs to carry out no repackaging or even movement of carriers 7 into different stored units.

In an alternative embodiment, the airlines can place orders directly with the hub distribution centres 20, 21 and 22. The benefit of the receiving orders from the spoke distribution centres is that the spoke distribution centres can take into account local factors. For example, it may be known that because of a pricing policy, although a number of passengers have booked flights, not all passengers will turn up for those flights. Thus although the airline may request food for each passenger, it may not be necessary to supply that number. The order can thus be adjusted accordingly.

In another embodiment of the present invention, where meals are provided to passengers on a tray, each tray is assembled into a meal unit within the distribution centre 1. The tray will comprise the carrier 7 and the trays will be individually loaded into the trolley 8 in the conventional manner. However, in the distribution centre 1 there is provided no food manufacturing capability. Food is delivered pre-packaged from a remote food manufacturing centre. In the distribution centre 1 the received packaged food items are assembled onto a tray in order to assemble a meal unit. In this way, there is no handling of food except in packaged form within the distribution centre. In this way specialist food manufacturing centres can be utilised for manufacturing food and the distribution centre merely needs to assemble the food into meal units. This enables restaurants to be used as food manufacturing centres. The distribution centre will simply assemble the restaurant cooked food. The handling of the food within the distribution centre 1 is reduced and so long as careful control of the temperature of the food items and the date of the food items is carefully monitored, the necessary hygiene regulations can be met.

Although the present invention has been described herein above with reference to specific embodiments, it will be apparent to a skilled personnel in the art that modifications lie within the spirit and scope of the present invention.

For example, although the present invention has been described with reference to food items, the present invention is applicable to any food or drink items and particularly to food and drink items which are fragile or subject to hygiene regulations.

In the embodiments tags are described for the containers. Any suitable tag or unique identifying system can be used which can be electronically read remotely e.g. a microchip or RF tag. Although in the embodiments fixed tag detectors are used, the present invention is applicable to any type of tag detector including mobile tag detectors.

What is claimed is:

1. A method of delivering products for human consumption from a manufacturing centre to passenger carrying vehicles, the method comprising:

in a manufacturing centre, packaging the products into carriers, each carrier carrying a plurality of products;

delivering the carriers in bulk to a distribution centre; and at the distribution centre, loading predetermined numbers of the carriers into respective containers for distribution to the vehicles enabling the products to be distributed to passengers on the vehicle in transit.

2. A method according to claim 1 wherein the containers comprise trolleys and the carriers are adapted to fit the trolleys.

3. A method according to claim 1 wherein the distribution centre comprises a hub distribution centre, the method including distributing predetermined numbers of containers from the hub distribution centre to respective spoke distribution centres, and at the spoke distribution centres adjusting the numbers of carriers in respective said containers in dependence upon the requirements for respective vehicles and distributing the containers to the respective vehicles.

4. A method according to claim 2 wherein the distribution centre comprises a hub distribution centre, the method including distributing predetermined numbers of containers from the hub distribution centre to respective spoke distribution centres, and at the spoke distribution centres adjusting the numbers of carriers in respective said containers in dependence upon the requirements for respective vehicles and distributing the containers to the respective vehicles.

5. A method according to claim 1 wherein the containers are distributed to the vehicles from the distribution centre, and the predetermined number of carriers loaded into respective containers is dependant upon the required number for respective vehicles.

6. A method according to claim 2 wherein the containers are distributed to the vehicles from the distribution centre, and the predetermined number of carriers loaded into respective containers is dependent upon the required number for respective vehicles.

7. A method according to claim 3 including receiving an electronic order at the hub distribution centre for products from product distributors who distribute the products to the passengers on the vehicle and placing an electronic order with the manufacturing centre for a bulk delivery of products in the carriers; and receiving electronic data at the spoke distribution centres on the number of products required for respective vehicles and determining the number of containers required.

8. A method according to claim 4 including receiving an electronic order at the hub distribution centre for products from product distributors who distribute the products to the passengers on the vehicle and placing an electronic order with the manufacturing centre for a bulk delivery of products in the carriers; and receiving electronic data at the spoke distribution centres on the number of products required for respective vehicles and determining the number of containers required.

9. A method according to claim 7 wherein the electronic order for products is received first by respective spoke distribution centres and passed on to the hub distribution centre, the spoke distribution centres being able to adjust the number of products in the order according to local circumstances.

10. A method according to claim 8 wherein the electronic order for products is received first by respective spoke distribution centres and passed on to the hub distribution centre, the spoke distribution centres being able to adjust the number of products in the order according to local circumstances.

11. A method according to claim 3 wherein said carriers each include an electronic tag, the method including detecting the tags at predetermined points during delivery, transmitting data on the detections to a computer system to track the location and keep a history for each carrier.

12. A method according to claim 4 wherein said carriers each include an electronic tag, the method including detecting the tags at predetermined points during delivery, transmitting data on the detections to a computer system to track the location and keep a history for each carrier.

13. A method according to claim 7 wherein said carriers each include an electronic tag, the method including detecting the tags at predetermined points during delivery, transmitting data on the detections to a computer system to track the location and keep a history for each carrier.

14. A method according to claim 8 wherein said carriers each include an electronic tag, the method including detecting the tags at predetermined points during delivery, transmitting data on the detections to a computer system to track the location and keep a history for each carrier.

15. A method according to claim 9 wherein said carriers each include an electronic tag, the method including detecting the tags at predetermined points during delivery, transmitting data on the detections to a computer system to track the location and keep a history for each carrier.

16. A method according to claim 10 wherein said carriers each include an electronic tag, the method including detecting the tags at predetermined points during delivery, transmitting data on the detections to a computer system to track the location and keep a history for each carrier.

17. A method according to claim 11 wherein the carriers are delivered in at least one bulk carrier to the distribution centre, the at least one bulk carrier including an electronic tag, the tag is detected at the manufacturing centre and at the distribution centre, the detections are transmitted to a computer system to track the delivery of the bulk carrier, and when the bulk carrier is loaded with carriers at the manufacturing centre, information on the carriers loaded in the bulk carrier is transmitted to the computer system.

18. A method according to claim 12 wherein the carriers are delivered in at least one bulk carrier to the distribution centre, the at least one bulk carrier including an electronic tag, the tag is detected at the manufacturing centre and at the distribution centre, the detections are transmitted to a computer system to track the delivery of the bulk carrier, and when the bulk carrier is loaded with carriers at the manufacturing centre, information on the carriers loaded in the bulk carrier is transmitted to the computer system.

19. A method according to claim 13 wherein the carriers are delivered in at least one bulk carrier to the distribution centre, the at least one bulk carrier including an electronic tag, the tag is detected at the manufacturing centre and at the distribution centre, the detections are transmitted to a computer system to track the delivery of the bulk carrier, and when the bulk carrier is loaded with carriers at the manufacturing centre, information on the carriers loaded in the bulk carrier is transmitted to the computer system.

20. A method according to claim 14 wherein the carriers are delivered in at least one bulk carrier to the distribution centre, the at least one bulk carrier including an electronic tag, the tag is detected at the manufacturing centre and at the distribution centre, the detections are transmitted to a computer system to track the delivery of the bulk carrier, and when the bulk carrier is loaded with carriers at the manufacturing centre, information on the carriers loaded in the bulk carrier is transmitted to the computer system.

21. A method according to claim 15 wherein the carriers are delivered in at least one bulk carrier to the distribution centre, the at least one bulk carrier including an electronic tag, the tag is detected at the manufacturing centre and at the distribution centre, the detections are transmitted to a computer system to track the delivery of the bulk carrier, and when the bulk carrier is loaded with carriers at the manufacturing centre, information on the carriers loaded in the bulk carrier is transmitted to the computer system.

22. A method according to claim 16 wherein the carriers are delivered in at least one bulk carrier to the distribution centre, the at least one bulk carrier including an electronic tag, the tag is detected at the manufacturing centre and at the distribution centre, the detections are transmitted to a computer system to track the delivery of the bulk carrier, and when the bulk carrier is loaded with carriers at the manufacturing centre, information on the carriers loaded in the bulk carrier is transmitted to the computer system.

23. A method according to any one of claims 11 to 22 wherein the carriers each include a temperature detector for detecting ambient temperature, the temperature detector warning if the detected temperature moves outside a predetermined range or threshold.

24. A method according to claim 1 or claim 2 wherein the products are fragile or subject to hygiene regulations.

25. A delivery tracking system for tracking the delivery of products for human consumption from a manufacturing centre to passenger carrying vehicles, the system comprising:

a plurality of carriers, each carrier having a unique electronic tag and being adapted to carry a plurality of products for human consumption;

tag detectors located at the manufacturing centre and at a distribution centre for detecting the tags;

a computer system for receiving tag detections and for tracking the delivery of the products and delivery history for each carrier.

26. A delivery tracking system according to claim 15 including tag detectors for detecting carriers delivered to the vehicles.

27. A delivery tracking system according to claim 25 or claim 26 wherein each carrier includes a temperature detector for detecting ambient temperature and for generating warning when the temperature moves outside a predetermined temperature range or threshold, and the computer system is adapted to receive any warnings and record the time of the warnings for carriers.

28. A delivery tracking system according to claim 25 wherein the carriers are adapted to fit trolleys for distributing the products to passengers on the vehicle in transit.

29. A method of delivering meals to passenger carrying vehicles, the method comprising:

at a distribution centre, receiving separately packaged items from food preparing stations;

assembling the separately packaged items on a tray to form a meal unit, and loading the meal units into trolleys; and distributing the trolleys to the vehicles.

30. A method according to claim 29 wherein the food preparing stations comprise restaurants, the method including carrying out final preparation on each meal unit on the vehicle by a chef before serving to the passengers.

31. A method according to claim 29 including controlling the ambient temperature of the food from delivery from the food preparing stations to delivery to the vehicles.

32. A carrier for use in the method of claim 2 comprising:

a structure having a base and sides, the sides having grooves therein for co-operation with ridges on the inside walls of trolleys to hold the carriers; and a unique electronic tag.

* * * * *

UNITED STATES PATENT AND TRADEMARK OFFICE

CERTIFICATE OF CORRECTION

PATENT NO. : 6,445,976 B1
DATED : September 3, 2002
INVENTOR(S) : Ostro

It is certified that error appears in the above-identified patent and that said Letters Patent is hereby corrected as shown below:

Column 9, lines 8-28 and Column 10, lines 1-26,
Delete claims 25-32.

Signed and Sealed this

Seventeenth Day of February, 2004

JON W. DUDAS
*Acting Director of the United States Patent and Trademark Office*